March 15, 1955 D. R. BAIRD 2,704,340

SEMICONDUCTOR DEVICES AND THEIR MANUFACTURE

Filed June 5, 1953

INVENTOR.
Donald R. Baird

BY [signature]
ATTORNEY

United States Patent Office 2,704,340

Patented Mar. 15, 1955

2,704,340

SEMICONDUCTOR DEVICES AND THEIR MANUFACTURE

Donald Raymond Baird, Avenel, N. J., assignor to Radio Corporation of America, a corporation of Delaware Application June 5, 1953, Serial No. 359,709

6 Claims. (Cl. 317—235)

This invention relates generally to semiconductor devices such as transistors, and particularly to point contact transistors and to improved methods for their manufacture.

A transistor is a device which may be used in amplifier, oscillator, modulator and the like circuits. The point contact transistor consists essentially of a crystal of semiconducting material such as silicon or germanium provided with three electrodes. One of the electrodes is called the base electrode and is in low-resistance contact with the crystal; the emitter and collector electrodes are in rectifying contact with the crystal. Usually the base electrode consists of a sheet or block of metal which is soldered to the crystal to provide a low-resistance, large-area contact. The emitter and collector electrodes may consist of fine wires having pointed ends in contact with the crystal to provide rectifying, small-area or point contacts. It is, of course, also feasible to provide emitter and collector electrodes in line contact or even in large-area contact with the crystal as long as they are in rectifying contact therewith.

It has been found that transistors made in the past have electrical characteristics which are unstable. For example, the direct current characteristics of transistors may vary by as much as 100 per cent from day to day and their power gain frequently decreases over a period of weeks whether they are stored on a shelf or used. It is believed that this instability is due to moisture or other materials contained in the air which attack the emitter and collector electrode contacts with the crystal. Furthermore, changes of the ambient temperature influence the collector contact and change the impedance looking into the collector electrode. Finally, in the case of the point contact transistor, mechanical movements of the point contacts and particularly of the collector contact are believed to be detrimental to the stability of the electrical characteristics of the transistor.

Since most of the instability which has been found in the prior art transistors is believed to be due to mechanical movements and chemical attack on the contact areas of the rectifying electrodes with the crystal, various attempts have been made to protect the areas in which the emitter and collector electrodes contact the crystal. A crystal detector has previously been proposed wherein a gel is in contact with the surface of the crystal and its point contact. Such a gel may be prepared, for example, from a mixture of hydrogenated castor oil and polyisobutylene and mineral oil. These materials may improve the stability of the electrical characteristics by reducing to some degree the harmful effects of moisture attack on the contact area. However, these materials are comparatively soft and cannot entirely prevent mechanical movements of the emitter and collector electrodes.

Another construction has also previously been proposed in which point contact transistors are completely embedded in a thermosetting resin. However, it has been discovered that after the resin sets, the transistor shows a decrease in the rectifying properties of the emitter and collector contacts. This phenomenon is considered to be due to a chemical reaction between the resin and the surface of the germanium crystal. This reaction increases the back current of the collector contact which is defined as the collector current drawn at a given collector voltage when the emitter current is zero. For most circuit applications, this is an undesirable phenomenon since the collector back current should be as small as possible. In addition, shrinkage of the resin on setting disturbs the relationship between the point contact electrodes and may increase the pressure of the point contact electrodes on the body of the transistor. This increased electrode pressure increases the area of contact of the electrodes and also increases the back currents.

Another solution of the problem of movement of the parts of a point contact transistor is described in U. S. Patent 2,609,427 of J. P. Stelmak. In this patent, an insulating spacer is positioned between the contact electrodes of a transistor where the contact electrodes are ribbon-shaped. While this solution represents a considerable advance in the art, certain problems persist. For example, although the spacer prevents movement of the electrodes in a perpendicular direction toward each other, the electrodes may move laterally or perpendicularly away from each other.

In addition, when a plotting medium is applied to the transistor, the substance, as it flows over the parts of the transistor, may twist the spacer and thereby cause rotation of the wire electrodes with respect to each other about a vertical axis. Furthermore, the spacer may also be distorted, twisted or lost completely as it is handled during the preparation of the transistor.

Accordingly, an important object of this invention is to provide a transistor device of improved construction and an improved method of manufacturing such a device.

Another object is to provide an improved transistor which is resistant to mechanical shock, moisture, changes of temperature and to reactions between the various components of the device.

Another object is to provide improved transistors wherein the contact areas of the rectifying electrodes with the crystal are mechanically and electrically stabilized.

A further object is to provide an improved transistor having reduced collector back current.

In general the principles and objects of this invention are accomplished by assembling a transistor including a semiconductor crystal mounted on a base electrode and a pair of pointed wire or ribbon-shaped electrodes, separated by an insulating spacer. An insulating disk is also provided for supporting and maintaining the spacer and pointed electrodes in the desired relationship. If desired, this assembly of electrodes, spacer and crystal is covered with a layer of synthetic resinous plastic, wax or the like, preferably as a spray, which hardens and retains the established relationship. The transistor may then be embedded in a resilient resinous or other plastic medium which is capable of imparting a desired amount of structural rigidity to the device while allowing a certain amount of freedom for expansion and which is resistant to moisture and chemical reaction. The medium should be mechanically strong and should also be resistant to high temperatures. It should also have a low coefficient of expansion and it should not develop any volatile substances while it is cured or cast. If the resilient medium is employed, an auxiliary hard protective coating of organic material is provided around the protective organic medium to separate the medium and the device from the thermosetting resin in which the entire unit is "potted."

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Similar reference characters are applied to similar elements throughout the drawing.

Figure 1:
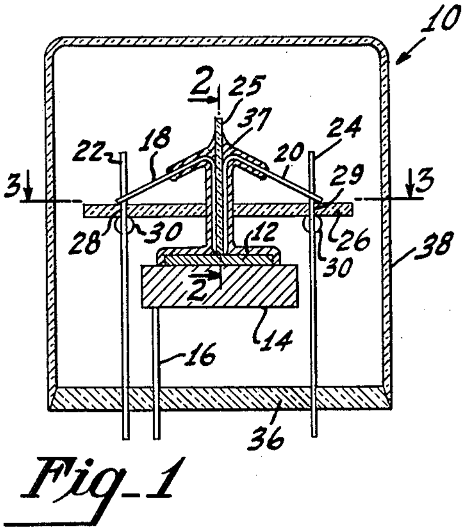
Fig. 1 is a sectional elevational view of a transistor device embodying the present invention.

The transistor described below may have any desired construction, preferably, however, the emitter and collector electrodes are constructed in accordance with the teachings of Rose in U. S. Patent 2,538,593. The construction of the base electrode and of the support for the crystal and the electrodes is preferably in accordance with the teachings of McLaughlin in U. S. Patent 2,595,475.

Referring to the drawing, there is illustrated a semiconductor device 10 comprising a block or crystal 12 of semiconductor material, for example germanium or silicon of N-type or P-type conductivity, soldered in low resistance, or ohmic contact, to a metallic supporting member 14 which may be in the form of a solid block, T-shaped, L-shaped, channel-shaped or the like. The member 14 may be made of brass or the like and comprises the base electrode for the completed transistor. A stiff wire or pin 16 of conducting material such as nickel is soldered, welded, or otherwise secured to the plate 14 to provide electrical contact with the block 12. The pin 16 may be offset to provide an indexed pin arrangement in the completed device.

Small-area contact electrodes 18 and 20 which are operated as the emitter and collector electrodes in the completed device consist of fine wires having sharpened contact points. Wires 18 and 20 may, for example, consist of steel, tungsten or phosphor bronze and may have a diameter of a few mils and a point diameter of the order of two-tenths of a mil. The contact regions of the wires may also be chisel-shaped or the like. The wires are soldered or welded to relatively stiff supporting wires 22 and 24, which may be of nickel or similar conductive material, in accordance with the teachings of the above-mentioned Rose patent. The wire electrodes 18 and 20 are spaced apart the desired distance on the surface of the crystal 12 by means of a spacer 25 of insulating material such as mica or the like. The spacer may be rectangular in shape or it may, for example, have tapered edges, as spacer 25' shown in Figure 2 to facilitate the insertion of the spacer between the wire electrodes 18 and 20. In any case, the small cross section of the spacer as seen in Figure 1 should be rectangular and the edge of the spacer in contact with the crystal surface should be flush therewith to insure accurate point electrode spacing.

Figure 3:
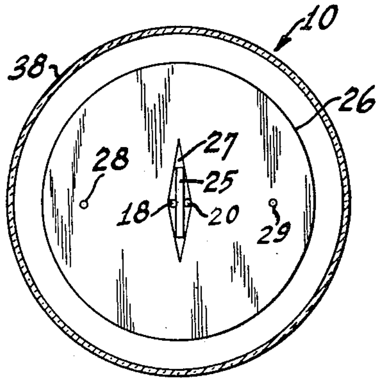
Fig. 3 is a sectional view along the line 3—3 in Fig. 1.
Figure 2:
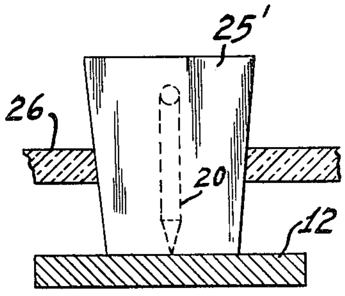
Fig. 2 is an enlarged sectional view along the line 2—2 in Fig. 1.
Figure 4:
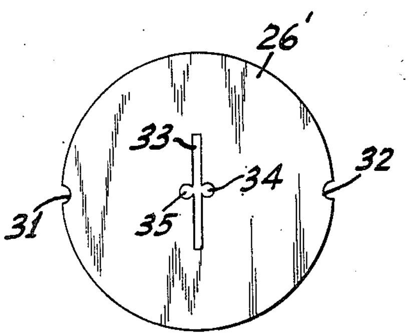
Fig. 4 is a top view of a first modification of a portion of a device prepared according to the invention.

According to the invention and referring to Figures 1 and 3, a support disk or plate 26 of insulating material such as mica or the like is provided for supporting the spacer 25 and point electrodes 18 and 20 in permanent relationship at the desired spacing. The disk 26 may be circular or rectangular or the like and has an opening 27, substantially in the center thereof in which the spacer 25 and point electrodes 18 and 20 are locked. The opening 27 is preferably diamond-shaped. The disk 26 also has a pair of openings 28 and 29 to receive the support rods 22 and 24 respectively which are provided with crimped portions 30 on which the disk 26 rests. Referring to Figure 4, a plate 26' may have such a diameter that the means for receiving the rods 22 and 24 may be notches 31 and 32 in the form of portions of circles, located on the periphery of the disk. Further referring to Figure 4, the opening for receiving and locking the mica spacer 25 and point electrodes 18 and 20 in position may comprise a rectangular portion 33 for the mica spacer and generally circular portions 34 and 35 on each side thereof for the electrodes 18 and 20.

The supporting wires 16, 22, and 24 are mounted on an insulating supporting member 36 which may be of glass or the like through which the wires extend. The ends of the wires extending below the member 26 may be used as electrical contact terminals or pins and they may be spaced in such a manner that they will fit, for example, a sub-miniature tube socket.

The preferred order of assembly of the component parts of the device 10 is as follows: First the support rods 16, 22, and 24 are bonded to the glass support 36. The side rods 22 and 24 are provided with the crimped portions 30 and the insulating plate 26 is slipped over the rods with the rods positioned within the openings 28 and 29 and the plate 26 supported by the crimped portions. Next the electrodes 18 and 20 are positioned within the opening 27 in the plate 26 and the ends remote from the pointed portions are welded to the rods 22 and 24. The support member 14 and the crystal 12 carried thereby are placed in position with the electrodes 18 and 20 exerting the desired pressure on the crystal 12. The support member 14 is then welded to the pin 16. Next, the mica spacer 25 is inserted between the electrodes 18 and 20 and is locked in position within the opening 27 with its ends in contact with opposite corners of the diamond shaped opening. Thus the electrodes 18 and 20 and the spacer 25 are locked rigidly in position. Insertion of the spacer 25 at this stage in the assembly provides the desired spacing between electrodes 18 and 20 and retains the desired electrode contact pressure on the surface of the semiconductor crystal.

Figure 5:
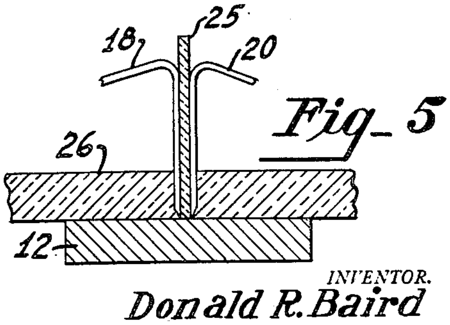
Fig. 5 is an enlarged sectional elevational view of a second modification of a portion of a device prepared according to the invention; and, Fig. 6 is a sectional elevational view of a third modification of the invention.

Whatever arrangement of parts is employed, the insulating disk 26 or 26' may occupy substantially any convenient position vertically along the electrodes 18 and 20. In a particularly convenient arrangement shown in Figure 5, the disk is positioned on the surface of the crystal 12 whereby additional support therefor is obtained. In this construction, the side rods 22 and 24 need not be crimped.

Since mica is a laminated material, when the opening 27 is cut in the disk, each lamina breaks at a different place and the edge of the opening is irregular in microscopic dimensions. The edge of each lamina is resilient and exhibits a spring-like action with the result that the electrodes 18 and 20 and spacer 25 are held in position as if by springs. Thus the dimensions of the opening are not, in themselves, critical and the opening need not be formed with high precision.

To further insure the retention of the established spatial relationship between the various parts of the transistor, referring to Figure 1, a thin coating 37 of an insulating, film-forming material may be deposited, preferably as a spray, on the wires 18 and 20, crystal 12, and spacer 25. The spray is applied sparingly and in a quantity just sufficient to hold the various parts in position without distorting them. The method of application of the spray material to the transistor parts is not a part of the present invention and is claimed in a co-pending application of the present inventor, Serial Number 352,519, filed May 1, 1953, which is assigned to the assignee of this application. An incidental advantage of the spray coating is that surface of the crystal 12 is further protected from moisture and the other protective media. The spray material may be a plastic such as Krylon or the like. Krylon is polymethyl methacrylate in a suitable solvent such as methyl or ethyl acetate. Any other film-forming synthetic resin soluble in volatile organic solvents can be used in place of the polymethyl methacrylate, for example the vinyl resins including polystyrene and the copolymers of vinyl chloride and vinyl acetate.

The transistor arrangement thus described and shown in Figure 1 is sufficiently strong and rigid so that, to complete the construction, the device need only be provided with a suitable housing 38 of metal, plastic, or the like which is bonded to the support member 36, preferably in air-tight engagement therewith.

Figure 6:
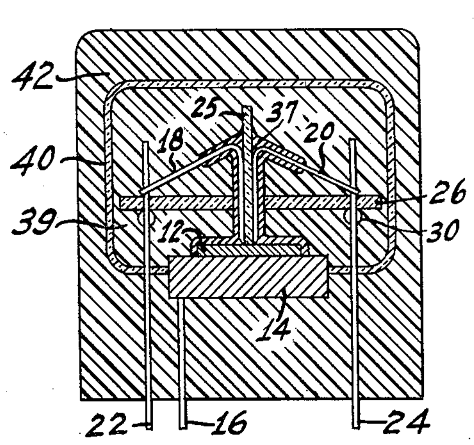

However, if it is desired or necessary to further protect the transistor, referring to Figure 6, the device 10 may be processed according to the teaching of Slade and Hambor in U. S. patent application, Serial Number 322,108, filed November 22, 1952 and assigned to the assignee of this application. According to Slade and Hambor, a matrix 39 comprising an organic medium in the form of a wax or wax-like material is molded around the previously coated crystal and electrodes 14, 18 and 20. The medium is such that, when set, it is resilient and does not cause mechanical distortion of the various components. The organic matrix is resistant to moisture, and does not react with the other materials employed in the device and in preparation of the device and specifically does not dissolve the spray material. Suitable materials for this matrix are waxes, such as paraffin wax, opal wax, ceresin wax, paratac, and petrolatum. Polymers of isobutylene having the desired characteristics may also be employed. The resilient protective medium may be applied in any suitable manner, for example, by softening the material and molding a quantity thereof around the resin-coated crystal 12, the resin-coated point contact electrodes 18 and 20 and portions of the contact leads or supporting wires 22 and 24. The wax may also enclose all or a part of the base electrode 14. The transistor may also be dipped in the softened wax, a quantity of which becomes attached to the crystal and electrodes.

Next, the composite device formed by embedding the transistor in the wax 39 is covered with a layer 40 of a hard protective material such as coil dope which comprises a solution of polystyrene in tuluol. The hardened coating of coil dope surrounds the wax 39 and protects the wax from heat thereby facilitating succeeding operations. The coil dope may be applied by a dipping operation or in any other suitable fashion. Synthetic resins, soluble in organic solvents, other than polystyrene may also be used.

Finally, a mold 42 of a thermosetting resin such as Araldite is cast about the transistor, its surrounding wax medium 39 and the coil dope layer 40, and the supporting wires 22 and 24 extending above the insulating base 36, of glass or the like, so that the device is completely embedded in the resinous medium. Suitable specific methods for forming the protective Araldite medium around the transistor are described in the copending application of B. N. Slade and G. M. Rose referred to above.

In general it may be stated that "Araldites" are condensation products of poly-arylepoxy-ethane compounds and derivatives of such polymers. For further information on the chemical composition of these resins reference is made to the literature referred to in the aforementioned Slade and Rose application. If desired, an inert pigment, such as titanium dioxide, may be added to the resin to reduce the transparency of the resin. In this construction, the housing 38 may be dispensed with if desired.

What is claimed is:

1. A semiconductor device comprising a semiconductor body, at least two small area contact electrodes in contact with said body, an insulating spacer between said electrodes, support rods connected to said electrodes, and an insulating support plate having a plurality of openings, adapted to receive said electrodes and said spacer and said support rods.

2. A semiconductor device comprising a semiconductor body, at least two small area contact electrodes in contact with said body, an insulating spacer between said electrodes, support rods connected to said electrodes, and an insulating support plate having a substantially central opening adapted to receive said electrodes and said spacer, said plate also having other openings adapted to receive said support rods.

3. The device as set forth in claim 2 and wherein said central opening is substantially diamond-shaped.

4. A semiconductor devicc comprising a semiconductor body, at least two small area contact electrodes in contact with said body, an insulating spacer between said electrodes, support rods connected to said electrodes, and an insulating support plate having a substantially central diamond-shaped opening adapted to receive said electrodes and said spacer, said spacer being oriented along one axis of said diamond and with the ends thereof bearing against opposite corners of said diamond, said electrodes being positioned one each on opposite sides of said spacer and within the remaining opposite corners of said diamond.

5. A semiconductor device comprising a semiconductor body including at least two small area contact electrodes in contact with said body, an insulating spacer between said two electrodes, and an insulating support plate having an opening, said two electrodes and said spacer being positioned and supported within said opening and a relatively thin coating of a film-forming material soluble in volatile organic solvents on said electrodes, said spacer, and said body to retain the established spatial relationship therebetween.

6. A semiconductor device comprising a semiconductor body including at least two small area contact electrodes in contact with said body, an insulating spacer between said two electrodes, and an insulating support plate having an opening, said two electrodes and said spacer being positioned and supported within said opening and a relatively thin coating of a film-forming material soluble in volatile organic solvents on said electrodes, said spacer, and said body to retain the established spatial relationship therebetween, a moisture-resistant wax superposed over said coating and surrounding said body, and said electrodes and spacer to hold them in a predetermined position of adjustment, a layer of thermoplastic synthetic resinous material surrounding said wax, and a protective thermosetting resinous medium disposed over said coating and surrounding said body and said electrodes and spacer.

References Cited in the file of this patent

UNITED STATES PATENTS

| | | |
|---|---|---|
| 2,378,944 | Ohl | June 26, 1945 |
| 2,634,323 | Pantchechnikoff | Apr. 7, 1953 |